(12) United States Patent
Tang et al.

(10) Patent No.: US 11,653,807 B2
(45) Date of Patent: May 23, 2023

(54) SELF-CLEANING METHOD OF SELF-MOVING CLEANING ROBOT AND SELF-MOVING CLEANING ROBOT

(71) Applicant: ECOVACS ROBOTICS CO., LTD., Suzhou (CN)

(72) Inventors: Zeheng Tang, Suzhou (CN); Shoumu Wang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 640 days.

(21) Appl. No.: 16/611,814

(22) PCT Filed: Apr. 17, 2018

(86) PCT No.: PCT/CN2018/083290
§ 371 (c)(1),
(2) Date: Nov. 7, 2019

(87) PCT Pub. No.: WO2018/210085
PCT Pub. Date: Nov. 22, 2018

(65) Prior Publication Data
US 2020/0060497 A1 Feb. 27, 2020

(30) Foreign Application Priority Data
May 19, 2017 (CN) .......................... 201710358573.5

(51) Int. Cl.
*A47L 11/40* (2006.01)
*A47L 9/28* (2006.01)
*A47L 11/30* (2006.01)

(52) U.S. Cl.
CPC ......... *A47L 11/4011* (2013.01); *A47L 9/2842* (2013.01); *A47L 9/2847* (2013.01); *A47L 11/302* (2013.01); *A47L 2201/06* (2013.01)

(58) Field of Classification Search
CPC .... A47L 9/2852; A47L 9/2842; A47L 9/2847; A47L 2201/06; A47L 11/4011
See application file for complete search history.

(56) References Cited

U.S. PATENT DOCUMENTS 10,064,528 B1 * 9/2018 Ebrahimi Afrouzi ....................... A47L 9/1409
2007/0016328 A1 * 1/2007 Ziegler ................... A47L 9/009 701/23

(Continued)

FOREIGN PATENT DOCUMENTS

CN 101283894 A 10/2008
CN 101420896 A 4/2009

(Continued)

OTHER PUBLICATIONS

WO-2017190785-A1 translation (Year: 2017).*

(Continued)

*Primary Examiner* — Monica S Carter
*Assistant Examiner* — Abbie E Quann
(74) *Attorney, Agent, or Firm* — Maschoff Brennan

(57) ABSTRACT

The present disclosure provides a self-cleaning method of a self-moving cleaning robot and a self-moving cleaning robot. The self-moving cleaning robot has both a basic working mode and a self-cleaning mode. When the self-moving cleaning robot needs to perform self-cleaning, the following steps are performed: step 100: controlling the self-moving cleaning robot to enter the self-cleaning mode; step 200: performing, by the self-moving cleaning robot, at least one self-cleaning action; and step 300: when at least one condition for ending the self-cleaning action is met, exiting the self-cleaning mode, the step 100 includes: adjusting parameters related to the operation of the self-moving cleaning robot while substantially maintaining the basic working mode. The present disclosure automatically clean (Continued)

part of the stains left at a rolling brush, a rolling brush cavity, a water suction port, a dust suction port and an air duct of the self-moving cleaning robot without changing an original working mode of the self-moving cleaning robot, and can prevent remaining pollutants from dropping onto a working surface to cause secondary pollution, is easy to operate and convenient to control, and can effectively realize a self-cleaning process of the self-moving cleaning robot.

11 Claims, 2 Drawing Sheets

(56) References Cited

U.S. PATENT DOCUMENTS

| | | | |
|---|---|---|---|
| 2014/0130290 A1* | 5/2014 | Jang | A47L 9/108 |
| | | | 15/319 |
| 2017/0055796 A1* | 3/2017 | Won | A47L 11/4097 |
| 2017/0296021 A1 | 10/2017 | Li et al. | |

FOREIGN PATENT DOCUMENTS

| | | | |
|---|---|---|---|
| CN | 103767623 A | 5/2014 | |
| CN | 205181249 U | 4/2016 | |
| CN | 205338848 U | 6/2016 | |
| CN | 205411077 U | 8/2016 | |
| CN | 105982611 A | 10/2016 | |
| CN | 106214079 A | 12/2016 | |
| CN | 205947738 U | 2/2017 | |
| CN | 106510556 A | 3/2017 | |
| CN | 206102577 U | 4/2017 | |
| CN | 106618402 A | 5/2017 | |
| WO | WO-2017190785 A1 * | 11/2017 | ............ A47L 11/145 |

OTHER PUBLICATIONS

CN Office Action in Application No. 201710358573.5 dated Oct. 19, 2020.
CN Office Action in Application No. 201710358573.5 dated May 7, 2021.
CN Office Action in Application No. 201710358573.5 dated Sep. 8, 2021.

* cited by examiner

SELF-CLEANING METHOD OF SELF-MOVING CLEANING ROBOT AND SELF-MOVING CLEANING ROBOT

FIELD

The present disclosure relates to a self-cleaning method of a self-moving cleaning robot and a self-moving cleaning robot, and belongs to the field of manufacturing of small household appliances technology.

BACKGROUND

At present, the working mode of a water dust collector on the market is usually to spray water on the ground and collects sewage at the same time. However, after the work is finished, dirt such as dust will be accumulated in positions such as a dust suction port/washing port and an air duct of the machine, and it is very difficult for people to clean these positions by hand, and some positions cannot be even cleaned, which brings inconvenience to users. In addition, at the end of the work, remaining pollutants at the positions such as the dust suction port or the washing port may drop onto the working surface to cause secondary pollution.

The existing art No. CN106214079 discloses an automatic cleaning method and an apparatus. The description thereof discloses a working mode on page 4, in which an electric rotary mop cooperates with a front spraying head to spray water to the floor and a water suction port sucks away sewage. The last line on page 5 describes that a water inlet and a water drainage connection port are respectively connected to a water inlet and a water outlet of a user after the cleaning work is finished, and a cleaning machine automatically completes cleaning of the inside of the machine body. Obviously, a user needs to participate in the aforementioned cleaning mode to change an original working mode of the automatic cleaning equipment, so that the operation process is more cumbersome.

The existing art No. CN106214079 discloses a self-cleaning washing machine. The washing machine can clean part of sewage recycling components by itself. The description thereof on page 36 describes that the washing machine can directly clean an external water supply pipe by itself after finishing the work. Specifically, a cleaning brush needs to be separated from the external water supply pipe, and the external water supply pipe and a water outlet pipe head extends to a self-cleaning pipe together. Similarly, the aforementioned self-cleaning method also changes the original working mode of the cleaning mode, and is cumbersome in operation and unfavorable for long-time use.

SUMMARY

The present disclosure is directed to overcome the shortcomings in the existing art, and provides a self-cleaning method of a self-moving cleaning robot and a self-moving cleaning robot. Part of stains left at a rolling brush, a rolling brush cavity, a water suction port, a dust suction port and an air duct of the self-moving cleaning robot are automatically cleaned without changing an original working mode of the self-moving cleaning robot, and remaining pollutants can be prevented from dropping onto a working surface to cause secondary pollution. The self-moving cleaning robot is easy to operate and convenient to control, and a self-cleaning process of the self-moving cleaning robot can be effectively realized.

Solving the technical problem of the present disclosure is implemented by the following technical solution:

a self-cleaning method of a self-moving cleaning robot, in which the self-moving cleaning robot comprises a control system including a communication module for communicating with a user and/or a device external to the self-moving clearing robot, a storage module for storing at least one parameter related to the operation of the self-moving cleaning robot, and a control module for controlling the operation of the self-moving cleaning robot. The self-moving cleaning robot has a basic working mode in which the self-moving cleaning robot performs actions of spraying water on the ground and collecting sewage at the same time, and a self-cleaning mode in which the self-moving cleaning robot performs at least one self-cleaning action on one or more cleaning components, such as rolling brush, the rolling brush cavity, the water suction port, the dust suction port and the air duct of the self-moving cleaning robot. When the self-moving cleaning robot needs to perform the self-cleaning action, the following steps are performed:

step 100: controlling, by the control module, the self-moving cleaning robot from the basic working mode to enter the self-cleaning mode;

step 200: performing, by the self-moving cleaning robot, at least one self-cleaning action; and step 300: when at least one condition for ending the self-cleaning action is met, controlling, by the control module, the self-moving cleaning robot to exit the self-cleaning mode, wherein, controlling, by the control module, the self-moving cleaning robot from the basic working mode to enter the self-cleaning mode includes: adjusting parameters related to the operation of the self-moving cleaning robot while substantially maintaining the basic working mode.

Specifically, the step 100 specifically includes: controlling, by the control module, the self-moving cleaning robot from the basic working mode to enter the self-cleaning mode based on at least one input signal received by the communication module from a user.

Or, the step 100 specifically includes: when the self-moving cleaning robot exits the basic working mode, automatically controlling, by the control module, the self-moving cleaning robot to enter the self-cleaning mode.

More specifically, the self-cleaning action in the step 200 is performed in a small region. The small region is 1 to 3 m$^2$.

In order to meet different cleaning requirements, the self-cleaning action performed in the small region includes in-situ operation action or in-situ spinning action or spiral walking action.

In order to achieve a better cleaning effect, the self-cleaning action in the step 200 specifically includes: increasing the suction force and/or water spray flow in the cleaning system of the self-moving cleaning robot. Specifically, the suction force in the self-cleaning mode is increased to 1.5 times or above of the suction force in the basic working mode, and the water spray flow in the self-cleaning mode is increased to 1.5 times or above of the water spray flow in the basic working mode.

In addition, the at least one condition for ending the self-cleaning action includes a duration time condition, namely: a preset self-cleaning duration time is stored in the storage module of the control system of the self-moving cleaning robot, an automatic timing device arranged in the self-moving cleaning robot controls the actual self-cleaning duration time and compares it to the preset self-cleaning duration time, when the actual self-cleaning duration time reaches the preset duration time, the self-moving cleaning robot exits the self-cleaning mode.

The at least one condition for ending the self-cleaning action may also include a water level condition, namely: a preset water level lower limit threshold value is stored in the storage module of the control system of the self-moving cleaning robot, a water level detection device arranged in the self-moving cleaning robot detects the actual water level and compares it to the preset water level lower limit threshold value, when the actual water level reaches the preset water level lower limit threshold value, the self-moving cleaning robot exits the self-cleaning mode.

The present disclosure further provides a self-moving cleaning robot, including a machine body. A control system, a cleaning system and a walking system are arranged in the machine body. A self-cleaning mode switching control module is arranged in the control system. The self-cleaning mode switching control module switches the self-moving cleaning robot from a basic working mode to enter a self-cleaning mode according to an input signal from a user, or the self-cleaning mode switching control module switches the self-moving cleaning robot from a basic working mode to enter the self-cleaning mode according to at least one condition for initiating the self-cleaning action preset in the control system to perform at least one self-cleaning action. Here, the self-cleaning mode switching control module switches the self-moving cleaning robot from the basic working mode to enter the self-cleaning mode by adjusting parameters related to the operation of the self-moving cleaning robot while substantially maintaining the basic working mode.

Specifically, the self-cleaning action is performed in a small region. The small region is 1 to 3 $m^2$.

More specifically, the self-cleaning action performed in the small region includes in-situ operation action or in-situ spinning action or spiral walking action.

In order to achieve a better cleaning effect, the self-cleaning action further includes: increasing suction force and/or water spray flow in the cleaning system.

Based on the above, the present disclosure provides the self-cleaning method of a self-moving cleaning robot and the self-moving cleaning robot. Part of the stains left at the rolling brush, the rolling brush cavity, the water suction port, the dust suction port and the air duct of the self-moving cleaning robot are automatically cleaned while substantially maintaining the previous basic working mode of the self-moving cleaning robot, and remaining pollutants can be prevented from dropping onto the working surface to cause secondary pollution. The self-moving cleaning robot is easy to operate and convenient to control, and the self-cleaning process of the self-moving cleaning robot can be effectively realized.

The technical solutions of the present disclosure will be described below in detail in combination with accompanying drawings and specific embodiments.

DETAILED DESCRIPTION OF EXAMPLE EMBODIMENTS

Figure 1:
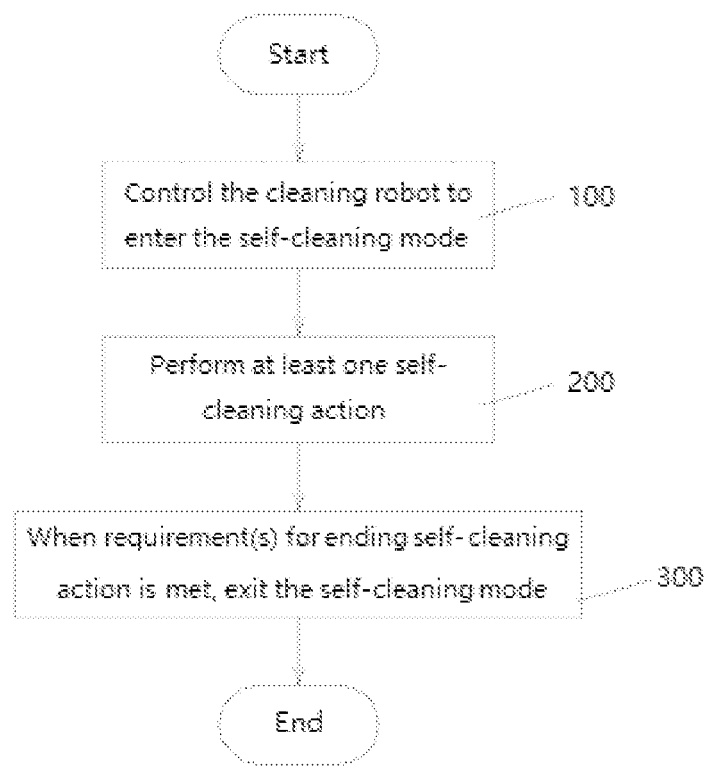
FIG. 1 is a basic flow chart of a self-cleaning method of a self-moving cleaning robot of the present disclosure.

FIG. 1 is a basic flow chart of a self-cleaning method of a cleaning machine of the present disclosure, in which the self-moving cleaning robot 1000 (also shown in FIGS. 2 and 3) comprises a control system 11 including a communication module 111 for communicating with a user and/or a device external to the self-moving clearing robot 1000 (e.g. receiving an input signal from a user), a storage module 112 for storing at least one parameter related to the operation of the self-moving cleaning robot 1000 (e.g. the conditions for initiating and ending the self-cleaning action), and a control module 113 for controlling the operation of the self-moving cleaning robot 1000 (e.g. switching the operation mode of the self-moving cleaning robot according to an input signal received from a user and/or a preset parameter stored in the storage module 112). As shown in FIG. 1, the present disclosure provides a self-cleaning method of a self-moving cleaning robot 1000. The self-moving cleaning robot 1000 has a basic working mode in which the self-moving cleaning robot 1000 performs actions of spraying water on the ground and collecting sewage at the same time, and a self-cleaning mode in which the self-moving cleaning robot 1000 performs at least one self-cleaning action on one or more cleaning components, such as rolling brush, the rolling brush cavity, the water suction port, the dust suction port and the air duct of the self-moving cleaning robot 1000. When the self-moving cleaning robot 1000 needs to perform the self-cleaning action, the following steps are performed:

step 100: controlling, by the control module 113, the self-moving cleaning robot 1000 from the basic working mode to enter the self-cleaning mode;

step 200: performing, by the self-moving cleaning robot 1000, at least one self-cleaning action; and step 300: when at least one condition for ending the self-cleaning action is met, controlling, by the control module 113, the self-moving cleaning robot 1000 to exit the self-cleaning mode.

wherein, controlling, by the control module 113, the self-moving cleaning robot 1000 from the basic working mode to enter the self-cleaning mode includes: adjusting parameters related to the operation of the self-moving cleaning robot 1000 while substantially maintaining the basic working mode.

Specifically, the step 100 specifically includes that: controlling, by the control module 113, the self-moving cleaning robot 1000 from the basic working mode to enter the self-cleaning mode based on at least one input signal received by the communication module 111 from a user. In an actual operation process, the signal may be input in different manners according to user's different requirements. For example, the user manually presses a self-cleaning mode button on the self-moving cleaning robot 1000 to control the self-moving cleaning robot 1000 from the basic working mode to enter the self-cleaning mode, or the user may also remotely control the self-moving cleaning robot 1000 from the basic working mode to enter the self-cleaning mode through a remote controller. Of course, the user may also control the self-moving cleaning robot 1000 from the basic working mode to enter the self-cleaning mode through a mobile phone with an operation APP. Or, the step 100 may further specifically include that: automatically controlling, by the control module 113, the self-moving cleaning robot 1000 from the basic working mode to enter the self-cleaning mode based on at least one condition stored in the storage module 112. The various aforementioned operation processes may be all controlled to be performed at any time in a working state of the self-moving cleaning robot. For example, when the self-moving cleaning robot exits the basic working mode, or before the self-moving cleaning robot 1000 returns to a charging dock, the self-moving cleaning robot 1000 may be automatically controlled by the control module 112 to enter the self-cleaning mode. For another example, during working (such as lateral walking work, random walking work or spiral walking work), the self-moving cleaning robot 1000 may also enter the self-cleaning mode after receiving the signal from a user.

When the self-moving cleaning robot 1000 enters the self-cleaning mode, at least one self-cleaning action is initiated. Specifically, in order to improve the self-cleaning efficiency, the self-cleaning action in the step 200 is performed in a small region, and the small region is 1 to 3 m². In order to meet different cleaning requirements, the self-cleaning action performed in the small region includes in-situ operation action or in-situ spinning action or spiral walking action. In order to better complete the self-cleaning work and achieve the objective of washing cleaning components, such as a rolling brush and an air duct, the self-cleaning action in the step 200 specifically includes: increasing the suction force and/or water spray flow in the cleaning system 12 of the self-moving cleaning robot 1000. Specifically, the suction force in the self-cleaning mode is increased to 1.5 times or above of the suction force in the basic working mode, and the water spray flow in the self-cleaning mode is increased to 1.5 times or above of the water spray flow in the basic working mode.

That is, when the self-moving cleaning robot 1000 enters the self-cleaning mode, the motion mode thereof may be the in-situ operation action or the in-situ spinning action or the spiral walking action. Specifically, the in-situ operation action means that the self-moving cleaning robot 1000 is operated in situ with no motion, and only sucks water by a suction force in the cleaning system 12, or only increases the suction force and/or increases the water spray flow, and the machine body does not do any motion, either, and no motion track is formed. The in-situ spinning action means that the machine body 10 of the self-moving cleaning robot 1000 moves clockwise or anticlockwise in the small region, and a motion track may be a whole circle or half of a circle. The spiral walking motion refers to a walking action done by the self-moving cleaning robot 1000 in the small region, forming a spiral motion track. The in-situ operation action or the in-situ spinning action or the spiral walking action may also be divided into an in-situ action or a moving action. Only one of the two actions generally occurs. The self-moving cleaning robot 1000 substantially maintains the basic working mode after entering the self-cleaning mode, and is caused to perform an action in the small region by adjusting a working state, or meanwhile, only the suction force or the water spray flow is increased. The operation mode is simple, and the self-cleaning efficiency is high.

In addition, the at least one condition for ending the self-cleaning action includes a duration time condition, namely: a preset self-cleaning duration time is stored in the storage module 112 of the control system 11 of the self-moving cleaning robot 1000, an automatic timing device 21 arranged in the self-moving cleaning robot 1000 controls the actual self-cleaning duration time and compares it to the preset self-cleaning duration time, when the actual self-cleaning duration time reaches the preset duration time, the self-moving cleaning robot 1000 exits the self-cleaning mode. In a general case, the preset self-cleaning duration time is 10-20 seconds.

In addition to the duration time condition, the at least one condition for ending the self-cleaning action may also include a water level requirement, namely: a preset water level lower limit threshold value is stored in the storage module 112 of the control system 11 of the self-moving cleaning robot 1000, a water level detection device 22 arranged in the self-moving cleaning robot 1000 detects the actual water level and compares it to the preset water level lower limit threshold value, when the actual water level reaches the preset water level lower limit threshold value, the self-moving cleaning robot 1000 exits the self-cleaning mode.

Figure 2:
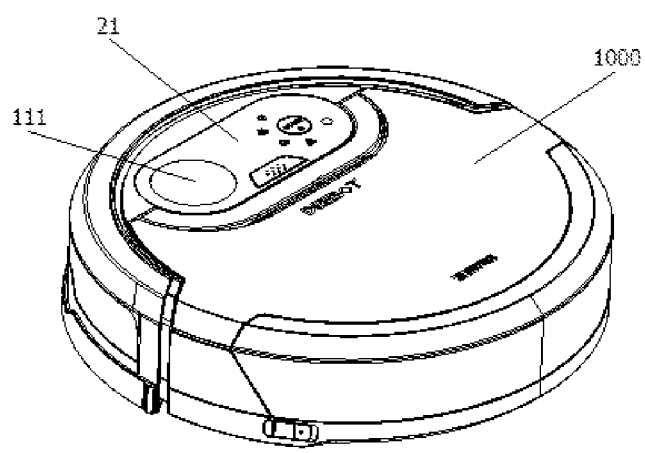
FIG. 2 is a schematic diagram of an outline structure of a self-moving cleaning robot of the present disclosure.
Figure 3:
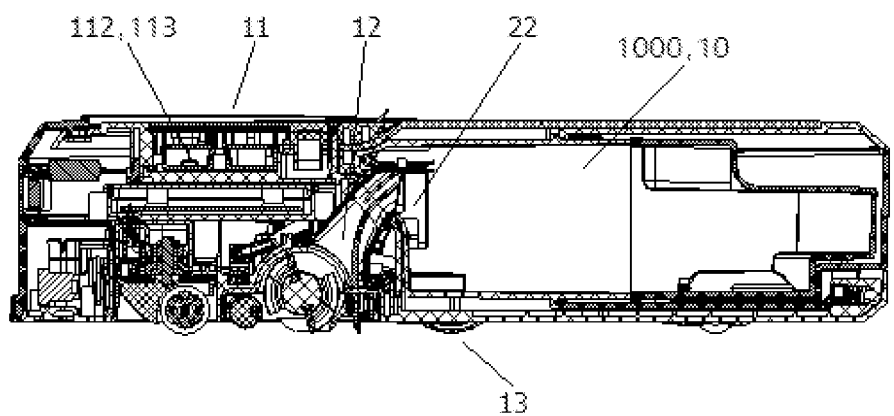
FIG. 3 is a sectional schematic diagram of a self-moving cleaning robot of the present disclosure.

FIG. 2 is a schematic diagram of an outline structure of a self-moving cleaning robot 1000 of the present disclosure; and FIG. 3 is a sectional schematic diagram of a self-moving cleaning robot 1000 of the present disclosure. As shown in FIGS. 2 and 3, the present disclosure further provides a self-moving cleaning robot 1000, including a machine body 10. A control system 11, a cleaning system 12 and a walking system 13 are arranged in the machine body 10. A self-cleaning mode switching control module is arranged in the control system 11. The control module 113 in form of self-cleaning mode switching control module switches the self-moving cleaning robot 1000 from a basic working mode to enter a self-cleaning mode according to an input signal from a user, or the self-cleaning mode switching control module automatically switches the self-moving cleaning robot 1000 from the basic working mode to enter the self-cleaning mode according to at least one condition for initiating the self-cleaning action preset in the control system 11. Here, the self-cleaning mode switching control module 113 switches the self-moving cleaning robot 1000 from the basic working mode to enter the self-cleaning mode by adjusting parameters related to the operation of the self-moving cleaning robot 1000 while substantially maintaining the basic working mode. Specifically, in order to improve the self-cleaning efficiency, the self-moving cleaning robot 1000 performs at least one self-cleaning action after entering the self-cleaning mode, and the self-cleaning action is performed in a small region, and the small region is 1 to 3 m². In order to meet different cleaning requirements, the self-cleaning action performed in the small region includes in-situ operation action or in-situ spinning action or spiral walking action. In order to better complete the cleaning work, the self-cleaning action further includes: increasing the suction force and/or water spray flow in the cleaning system 12.

Embodiment 1

In combination with FIGS. 1 to 3, a working process in the present embodiment is as follows:

in a process that the self-moving cleaning robot 1000 cleans a floor, if a user finds that the cleaned floor has partial heavy stains, the user then manually presses a self-cleaning mode button on a remote controller to control the self-moving cleaning robot 1000 to enter the self-cleaning mode. At this time, the self-moving cleaning robot 1000 is switched from an original walking state into a state of spinning at the same place to perform cleaning within a small region of about 2.5 m². Meanwhile, the suction force in the cleaning system 12 of the self-moving cleaning robot 1000 is increased to 1.8 times of the previous suction force in the original walking state, and the water spray flow is a double of the water spray flow in the original walking state. According to the increased water spray flow in the self-cleaning mode and the preset water level lower limit threshold value stored in the control system 11 of the self-moving cleaning robot 1000, when the actual water level detected by a water level detection device 22 arranged in the self-moving cleaning robot 1000 reaches the water level lower limit threshold value, the self-moving cleaning robot 1000 exits the self-cleaning mode.

Embodiment 2

In combination with FIGS. 1 to 3, a working process in the present embodiment is as follows:

in a process that the self-moving cleaning robot 1000 cleans a floor, if a user finds that there is water on the partial floor, the user controls the self-moving cleaning robot 1000 to enter the self-cleaning mode through a mobile phone with an operation APP. After entering the self-cleaning mode, the self-moving cleaning robot 1000 moves within a small region of 2 m², and the suction force is increased to 3 times of the previous suction force in the original walking state. According to the preset self-cleaning duration time stored in the control system 11 of the self-moving cleaning robot 1000, an automatic timing device 21 arranged in the self-moving cleaning robot 1000 controls the actual self-cleaning duration time and compares it to the preset self-cleaning duration time, such as 12 seconds. When the actual self-cleaning duration time reaches the preset duration time, the self-moving cleaning robot 1000 exits the self-cleaning mode.

Embodiment 3

In combination with FIGS. 1 to 3, a working process in the present embodiment is as follows:

when the self-moving cleaning robot 1000 exits the working mode, the self-moving cleaning robot 1000 automatically enters the self-cleaning mode. At this time, the self-moving cleaning robot 1000 moves within a small region of 3 m², forming a motion track, and the suction force and the water spray flow are both increased to a double of the original one in the previous basic working mode. After the self-cleaning action is performed for 15 seconds, the self-moving cleaning robot 1000 automatically exits the self-cleaning mode.

Embodiment 4

In combination with FIGS. 1 to 3, a working process in the present embodiment is as follows:

when the self-moving cleaning robot 1000 exits the working mode, the self-moving cleaning robot 1000 automatically enters the self-cleaning mode. At this time, the self-moving cleaning robot 1000 is staying at the position where it entered the self-cleaning mode, and the suction force and the water spray flow in this self-cleaning mode are also kept unchanged. After the self-cleaning action is performed for 20 seconds, the self-moving cleaning robot 1000 automatically exits the self-cleaning mode.

Based on the above, the present disclosure provides the self-cleaning method of a self-moving cleaning robot and the self-moving cleaning robot. Part of the stains, such as water spots, garbage and hairs, left at the rolling brush, the rolling brush cavity, the water suction port, the dust suction port and the air duct of the self-moving cleaning robot are automatically cleaned without changing the original working mode of the self-moving cleaning robot, and remaining pollutants can be prevented from dropping onto the working surface to cause secondary pollution. The self-moving cleaning robot is easy to operate and convenient to control, and the self-cleaning process of the self-moving cleaning robot can be effectively realized.

What is claimed is:

1. A self-cleaning method of a self-moving cleaning robot, wherein the self-moving cleaning robot comprises a control system including a communication module for communicating with a user and/or a device external to the self-moving cleaning robot, a storage module for storing at least one parameter related to the operation of the self-moving cleaning robot, and a control module for controlling operation of the self-moving cleaning robot; the self-moving cleaning robot has a basic working mode in which the self-moving cleaning robot performs actions of spraying water on the ground and collecting sewage at the same time, and a self-cleaning mode in which the self-moving cleaning robot performs at least one self-cleaning action on one or more cleaning components; and when the self-moving cleaning robot needs to perform the self-cleaning action, the following steps are performed: controlling, by the control module, the self-moving cleaning robot from the basic working mode to enter the self-cleaning mode; performing, by the self-moving cleaning robot, the at least one self-cleaning action; and when at least one condition for ending the self-cleaning action is met, controlling, by the control module, the self-moving cleaning robot to exit the self-cleaning mode; wherein, controlling, by the control module, the self-moving cleaning robot from the basic working mode to enter the self-cleaning mode includes adjusting parameters related to the operation of the self-moving cleaning robot while substantially maintaining the basic working mode, and wherein performing, by the self-moving cleaning robot, the at least one self-cleaning action includes increasing a suction force and/or a water spray flow in the self-moving cleaning robot.

2. The self-cleaning method according to claim 1, wherein controlling, by the control module, the self-moving cleaning robot from the basic working mode to enter the self-cleaning mode is based on at least one input signal received by the communication module from the user.

3. The self-cleaning method according to claim 1, wherein controlling, by the control module, the self-moving cleaning robot includes automatically entering the self-cleaning mode after exiting the basic working mode.

4. The self-cleaning method according to claim 1, wherein the self-cleaning action is performed in a small region, and the small region is 1 to 3 m².

5. The self-cleaning method according to claim 4, wherein the self-cleaning action performed in the small region comprises: in-situ operation action or in-situ spinning action or spiral walking action.

6. The self-cleaning method according to claim 1, wherein the suction force in the self-cleaning mode is increased to 1.5 times or above of the suction force in the basic working mode, and the water spray flow in the self-cleaning mode is increased to 1.5 times or above of the water spray flow in the basic working mode.

7. The self-cleaning method according to claim 1, wherein the at least one condition for ending the self-cleaning action includes a duration time condition, namely: a preset self-cleaning duration time is stored in the storage module of the control system of the self-moving cleaning robot; and an automatic timing device arranged in the self-moving cleaning robot controls an actual self-cleaning duration time and compares it to the preset self-cleaning duration time; and when the actual self-cleaning duration time reaches the preset self-cleaning duration time, the self-moving cleaning robot exits the self-cleaning mode.

8. The self-cleaning method according to claim 1, wherein the at least one condition for ending the self-cleaning action includes a water level condition, namely: a preset water level lower limit threshold value is stored in the storage module of the control system of the self-moving cleaning robot; and a water level detection device arranged in the self-moving cleaning robot detects an actual water level and compares it to the preset water level lower limit threshold value, when the actual water level reaches the preset water level lower limit threshold value, the self-moving cleaning robot exits the self-cleaning mode.

9. A self-moving cleaning robot, comprising a machine body, wherein a control system, a cleaning system and a walking system are arranged in the machine body; a self-cleaning mode switching control module arranged in the control system switches the self-moving cleaning robot from a basic working mode to enter a self-cleaning mode according to an input signal from a user, or the self-cleaning mode switching control module switches the self-moving cleaning robot from the basic working mode to enter the self-cleaning mode according to at least one condition for initiating at least one self-cleaning action stored in the control system to perform the at least one self-cleaning action, the self-cleaning mode switching control module switches the self-moving cleaning robot from the basic working mode to enter the self-cleaning mode by adjusting parameters related to operation of the self-moving cleaning robot while substantially maintaining the basic working mode, wherein the at least one self-cleaning action includes increasing a suction force and/or a water spray flow in the cleaning system of the self-moving cleaning robot.

10. The self-moving cleaning robot according to claim 9, wherein the at least one self-cleaning action is performed in a small region, and the small region is 1 to 3 $m^2$.

11. The self-moving cleaning robot according to claim 10, wherein the at least one self-cleaning action performed in the small region comprises: in-situ operation action or in-situ spinning action or spiral walking action.

* * * * *